Figures 1, 2:
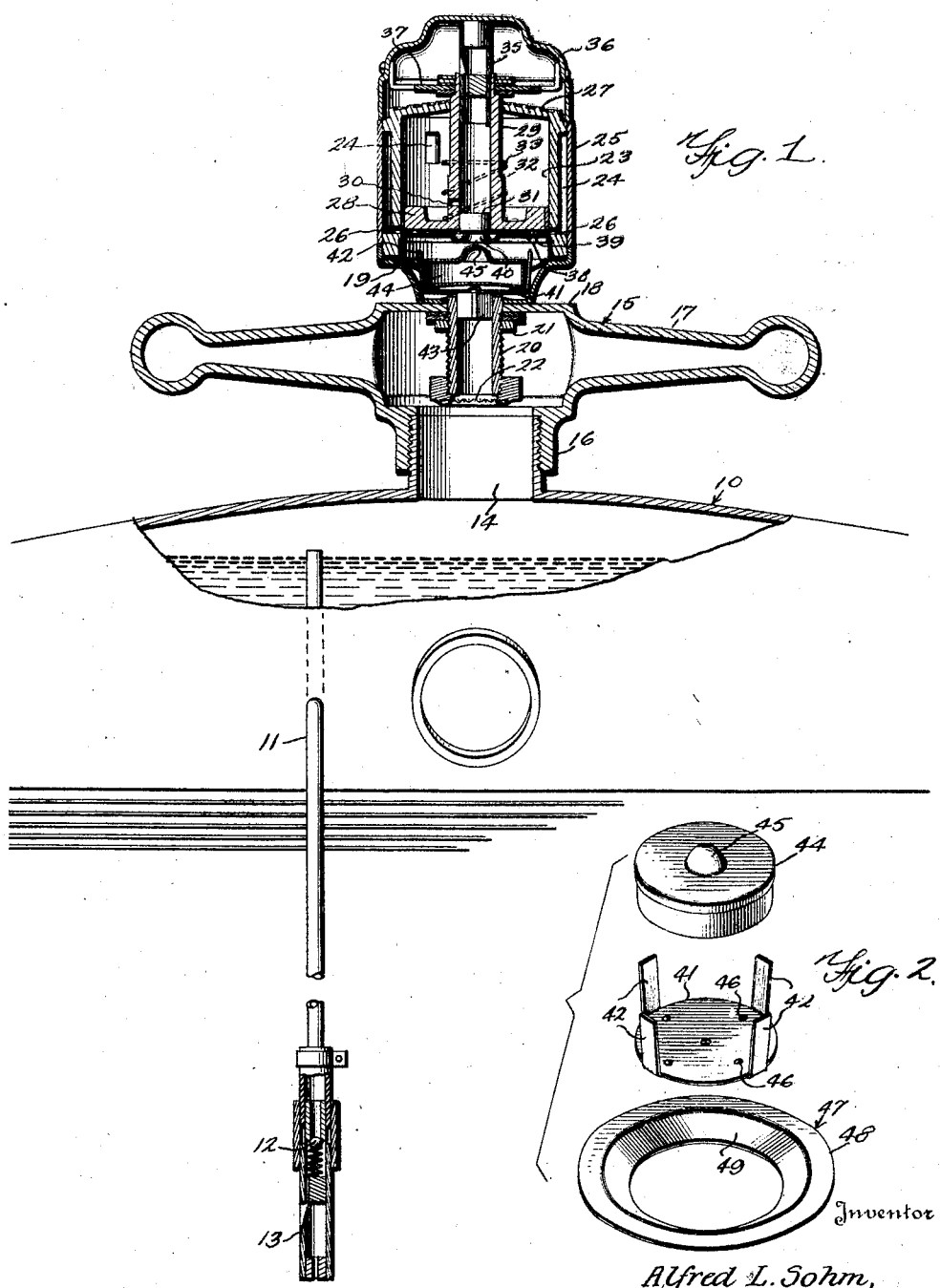

June 9, 1925.

A. L. SOHM

INDICATOR

Filed Oct. 2, 1924

1,541,074

Inventor

Alfred L. Sohm,

By

Attorney

Patented June 9, 1925.

1,541,074

UNITED STATES PATENT OFFICE.

ALFRED L. SOHM, OF CHICAGO, ILLINOIS.

INDICATOR.

Application filed October 2, 1924. Serial No. 741,291.

*To all whom it may concern:*

Be it known that I, ALFRED L. SOHM, a citizen of the United States, residing at Chicago, in the county of Cook and State of Illinois, have invented certain new and useful Improvements in Indicators, of which the following is a specification.

This invention relates to indicators and more particularly to a pressure operated device adapted for use in connection with the cooling system of a motor vehicle to indicate the presence of fluid pressures due to abnormal thermal conditions of the engine.

In a copending application Serial No. 664,985, filed September 26, 1923, I have shown and described an indicating device employing a cylinder having a piston mounted therein and adapted to be moved by fluid pressure within an automobile radiator to provide a warning signal when pressure is present within the radiator of the automobile. A diaphragm is provided beneath the piston and has a valve seat therein adapted to be closed by a float valve to prevent water from flowing upwardly into the cylinder under certain conditions, from whence it is blown outwardly through the whistle employed as an audible indicator.

With the construction shown and described in my copending application it has been found that under certain conditions the operation of the float valve is not instantaneous and occasionally water from the radiator finds its way to the atmosphere through the whistle before the float valve is properly seated. It is an important object of the present invention to provide an improved structure whereby closing of the float valve is greatly accelerated and loss of water minimized.

Other objects and advantages of the invention will be apparent during the course of the following description.

In the drawings I have shown one embodiment of the invention. In this showing,

Figure 1 is a central vertical sectional view through the device applied to an automobile radiator, parts being shown in elevation, and, Figure 2 is a detail perspective view of the float valve and associated elements.

Referring to the drawings, the numeral 10 designates an automobile radiator of the usual type adapted to contain the cooling fluid and provided with the usual overflow pipe 11, provided in the present instance with a spring controlled check valve 12. The check valve 12 is adapted to open at a predetermined pressure and fluid escaping therefrom is adapted to operate a whistle or other audible signal 13. The radiator is provided with the usual filling opening 14 which is externally threaded to receive the usual cap.

In the present instance I have shown a cap 15 having a depending sleeve 16 threaded for engagement with the threads of the filling opening and provided with hollow arms 17 which operate as condensers for fluid vapors from the radiator. The cap 15 is provided with a top 18 having a central opening for a purpose to be described.

The indicator is provided with a base 19 adapted to rest upon the top 18 of the filler cap and has a depending sleeve 20 extending through the opening in the top of the filler cap. A nut 21 is arranged on the sleeve 20 for securing the base 19 in position. A strainer 22 is arranged on the lower end of the sleeve to prevent dirt or other foreign matter from finding its way into the interior of the cylinder to be described.

The numeral 23 designates a pressure chamber formed in the present instance as a cylinder having an annular passage 24 formed in its outer face which is surrounded by a jacket 25 to form a condensing chamber. The chamber 24 communicates with the interior of the cylinder 23 through openings 26. The cylinder 23 is provided with a top 27 preferably colored red to provide a visible signal to be described, and the top is provided with a central axial opening.

A piston 28 is arranged to reciprocate within the cylinder 23 and is provided with a vertically extending hollow piston rod 29 provided with an opening 30 above the piston to provide communication between the interiors of the piston rod 29 and cylinder 23. The piston rod is closed at its lower end by a plug 31 and is provided intermediate its ends with a shoulder 32 adapted to engage the underside of the top 27 to limit the upward movement of the piston. A spring 33 surrounds the piston rod 29 and is adapted to engage the under side of the top 27 to resiliently oppose upward movement of the piston as the latter approaches its upper limit. The inner cylinder wall is provided with a groove or by-pass 34 which is slightly greater in height than the thickness of the piston 28 and is adapted to afford communication between opposite ends of the cylinder when the piston is at the upper limit of its movement. A whistle 35 is mounted upon the piston rod 29 and is adapted to be operated by fluid pressure therefrom. The whistle 35 is covered by a cap 36 secured to the piston rod by a spider 37. In the normal position of the device shown in Figure 1, the lower edges of the cap 36 are adapted to wholly cover the colored top 27 of the cylinder.

A diaphragm 38 is mounted within the cylinder just below the openings 26 and this diaphragm is provided with a plurality of small stamped-up portions 39 adapted to support the piston 28 to provide a slight space between the piston and diaphragm when the former is in its lower position. The diaphragm 38 is provided with a central valve seat 40 affording communication between the interior of the cylinder and the space below the diaphragm.

A basket 41 is arranged within and near the bottom of the base 19 as shown in Figure 1. The basket 41 is formed substantially as a disk having a plurality of upstanding arms 42 as shown in Figure 2. The basket is riveted or otherwise secured to a plug 43 which has a driving fit within the sleeve 20 and is preferably polygonal in shape to permit fluid in the sleeve 20 to flow upwardly into the interior of the base. The edges of the basket 41 are preferably slightly spaced from the sides of the base so as not to interfere with the passage of fluid into the base. A float 44 is arranged within the basket 41 as shown in Figure 1 and is provided with a knob or rounded portion 45 forming a valve adapted to engage the seat 40. It will be obvious that the upstanding arms 42 are adapted to serve as guides for the valve 44 to insure the proper seating of the extension 45 within the seat 40. The float 44 is preferably formed of very thin sheet metal so as to be highly buoyant when water flows upwardly into the base under conditions to be described. When the float is so formed it has been found that the bottom thereof often becomes slightly concave as shown in Figure 1. The float 44 is adapted to be supported upon projections 46 formed upon the basket 41 to allow water to flow freely under the float when the water is present within the base and it will be seen that the concavity of the lower wall of the float provides considerable space therebeneath which sometimes renders action of the valve somewhat sluggish.

As shown in Figures 1 and 2 the numeral 47 designates a dash plate as a whole comprising an outer horizontal flange 48 and an inner angular flange 49 which surrounds the arms 42 in close proximity thereto. The flange 48 is preferably clamped between the horizontal portion of the base 19 and the lower end of the cylinder 23 as shown in Figure 1.

The operation of the device is as follows:
When the automobile is in operation under normal conditions vapor is condensed within the arm 17 and the chamber 24 and liquid returned to the cooling system to prevent loss therefrom. Under abnormal operating conditions the water within the radiator may become overheated and thus create a fluid pressure within the radiator which is communicated to the interior of the cylinder 23 beneath the piston 28. Under this condition the piston will rise carrying with it the cap 36, uncovering the top 27 of the cylinder and providing a visible warning signal to the operator. If the pressure continues to increase the piston will be moved upwardly until the shoulder 32 contacts with the lower face of the top 27 whereupon communication between opposite ends of the cylinder will be established through the by-pass 34. Fluid will then flow through the opening 30, into the piston rod 29 and upwardly to operate the audible signal 35 thus providing an audible warning to the automobile operator. It will be obvious that vapors or steam may flow upwardly into the cylinder unimpeded under normal conditions, the float remaining in the normal position shown in Figure 1. If the operator of the vehicle substantially fills the radiator while the motor and water are cold, the water will expand materially after the engine has been in operation for sometime and this water will flow upwardly into the interior of the base 19. It has been found that the concavity of the bottom of the float 44 sometimes acts as an air pocket and when water flows upwardly around the float, the latter does not immediately become buoyant due to the slight vacuum created within the air pocket and some of the water flows upwardly into the interior of the cylinder before the valve is seated. This water is sometimes blown outwardly through the whistle 35 and spatters the hood and windshield of the vehicle. By providing the splash plate 47 I have found that upward flowing of the water around the float is retarded and the water redirected toward the float to create sufficient pressure thereagainst to break the slight vacuum created beneath the bottom of the float thus causing the latter to rise instantaneously and close communication between the interior of the base and the cylinder. When the valve 45 is properly seated, continued expansion of the water will open the check valve 12 and permit the excess water to flow outwardly through the whistle 13. It also will be obvious that an increase in pressure beyond that at which the whistle 35 is sounded will open the check valve 13 and blow outwardly through the whistle 13 providing a supplementary audible signal.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having described my invention, I claim:

1. The combination with a radiator of a motor vehicle, of a fluid pressure operated signal adapted to indicate abnormal conditions within the radiator, said signal including a valve seat adapted to afford communication between the radiator and said signal a valve chamber arranged below said seat, a float valve arranged in said chamber and adapted to engage said seat, and means surrounding said float within said chamber for directing water surrounding said float inwardly thereagainst.

2. The combination with a radiator of a motor vehicle, of a member divided by a partition to form upper and lower chambers, said partition being provided with a valve seat normally affording communication between said chambers, a signal adapted to be operated by a predetermined increase in pressure in said upper chamber, said lower chamber communicating with the interior of the radiator, a float valve mounted in said lower chamber and adapted to engage said seat, and an annular plate surrounding said valve and slightly spaced therefrom.

3. A device constructed in accordance with claim 2 wherein the portion of said plate adjacent said valve slopes downwardly toward said valve.

4. The combination with the radiator of a motor vehicle, of a pressure chamber, a signal adapted to be operated upon a predetermined pressure in said chamber, a hollow base arranged beneath said chamber and communicating with the radiator, a member arranged between said base and said chamber and forming a substantial closure for the lower end of said chamber, said member being provided with a valve seat adapted to afford communication between said chamber and said base, a float valve arranged in said base and adapted to engage said seat, and a splash plate secured between said base and said chamber and surrounding said float in close proximity thereto, the portion of said plate adjacent said valve being sloped downwardly and inwardly toward said valve.

In testimony whereof I affix my signature in presence of two witnesses.

ALFRED L. SOHM.

Witnesses:
CHARLES UPLEGGER,
T. W. JUSUP.